June 17, 1930. F. E. WEBB 1,765,188
POWER TAKE-OFF FOR TRACTORS
Filed April 22, 1929 3 Sheets-Sheet 2
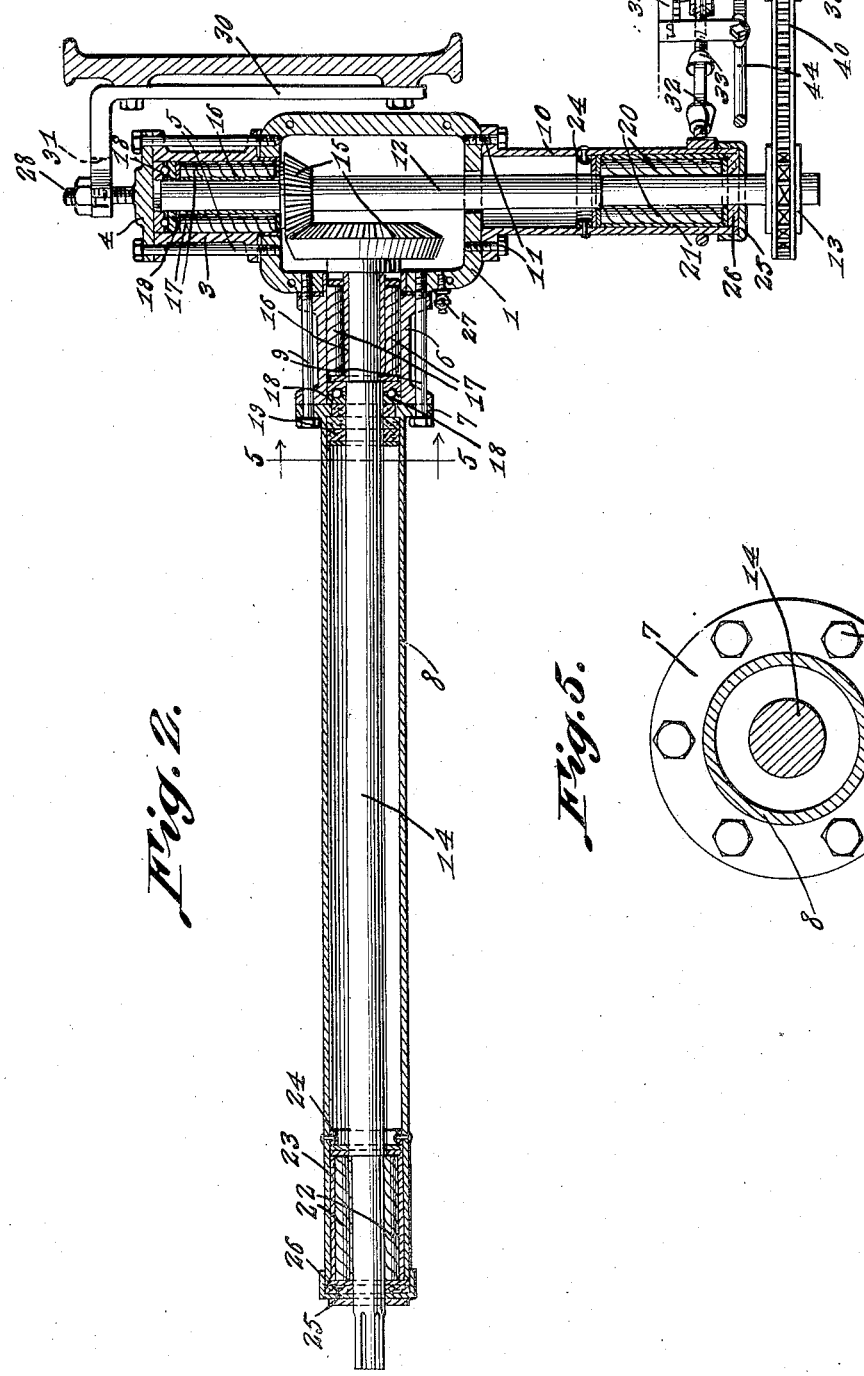

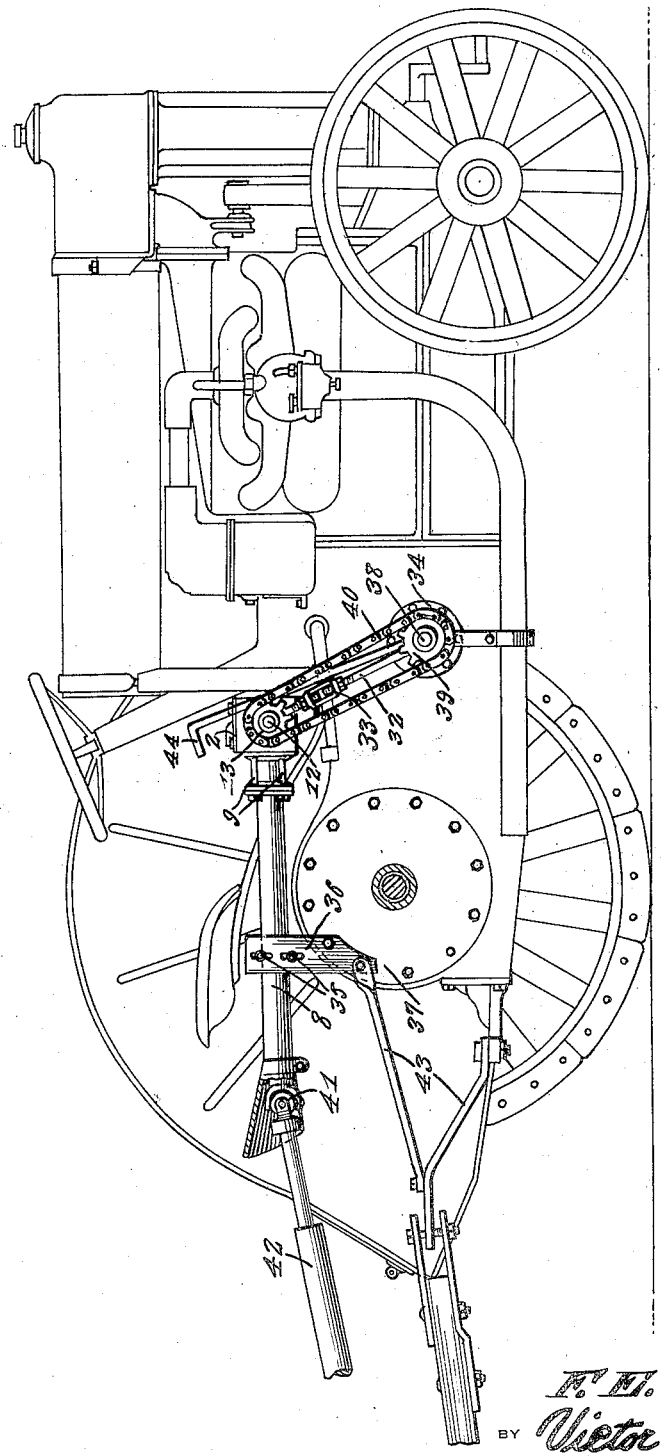

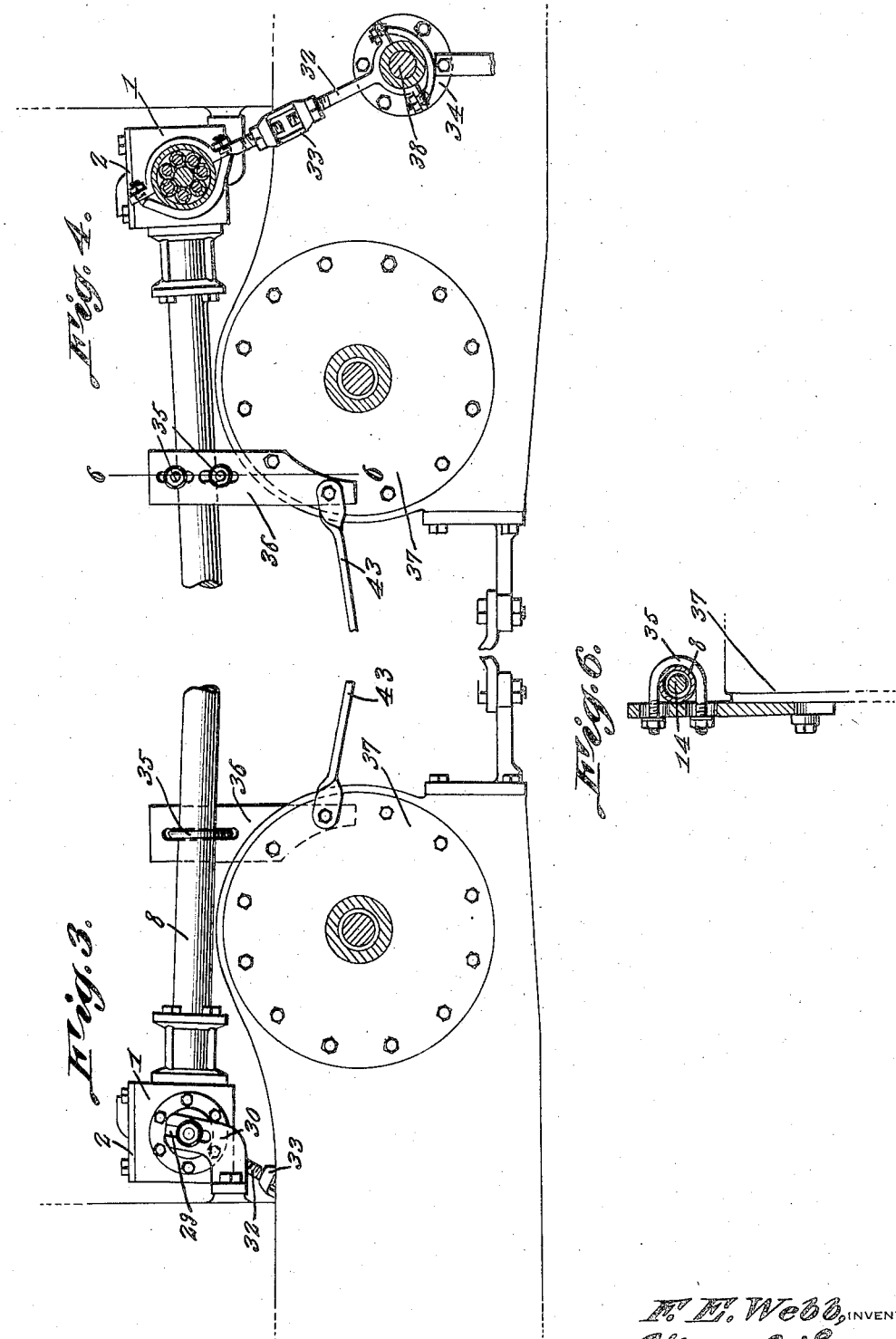

Patented June 17, 1930

1,765,188

UNITED STATES PATENT OFFICE

FORREST E. WEBB, OF DEFIANCE, OHIO

POWER TAKE-OFF FOR TRACTORS

Application filed April 22, 1929. Serial No. 357,269.

This invention relates to a power take-off for tractors, the invention being mainly designed for the Fordson type of tractor, the general object of the invention being to provide a take-off which can be easily and quickly put in place and which is so located that it will extend above the rear axle adjacent the center of the tractor so that short turns can be made in any direction without danger of damage to the parts and the take-off can be aligned with the drive shaft of the machinery hitched to the tractor, thereby eliminating clamping of the universal joints which connect the parts together.

Another object of the invention is to make the sprockets which are connected with the pulley shafts and with a shaft of the take-off interchangeable and of different sizes so that the take-off can be driven at two different speeds.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation of a tractor, showing the invention in use.

Figure 2 is a horizontal section through the take-off and parts of the tractor.

Figure 3 is a fragmentary view of one side of the tractor, showing the supporting means for the front end of the take-off.

Figure 4 is a similar view of the opposite side of the tractor, parts being shown in section.

Figure 5 is a section on line 5—5 of Figure 2.

Figure 6 is a section on line 6—6 of Figure 4.

In these drawings, the numeral 1 indicates the gear box of the take-off which is provided with a detachable cover plate 2 and 3 indicates a casing forming a race which is arranged at one end of the box, the casing and its cover plate 4 being attached to the box by the bolts 5. A similar casing 6 and the flange 7 of a shaft housing 8 is attached to the rear face of the box by the bolts 9, the box having openings therein which communicate with the casings. A short shaft housing 10 is attached to the other end of the box by the bolts 11, the box having a hole therein which communicates with the housing 10. A shaft 12 passes through the box, with one end extending into the casing 3, with its extremity spaced from the plate 4, and said shaft passes through the housing 10 and a sprocket 13 is detachably connected with this projecting end of the shaft. A shaft 14 passes through the housing 8 and through the casing 6 and gears 15 connect the shafts 12 and 14 together, these gears being arranged in the box 1 and are of the bevel type. Bearing sleeves 16 are arranged on the shafts 12 and 14 and are located in the casings 3 and 6, the ends of the sleeves being flanged to receive the bearing rollers 17 and thrust bearings 18 are arranged in the outer ends of the casings 3 and 6 to take the thrust of the rollers 17. Packing means 19 are arranged at the junction of the casing 6 with the housing 8 to provide an oil and dustproof joint at this point. Roller bearings 20 are placed in the outer end of the housing 10 and engage a reduced part of the shaft 12, a race sleeve 21 being arranged in the outer end of the housing 10 and enclosing these rollers and similar rollers 22 and a sleeve 23 are placed in the outer end of the housing 8. The rollers and sleeves are held in place by the rings 24 fastened to the internal walls of the housings 8 and 10 and by the caps 25 on the outer ends of said housings, packing means 26 being arranged between the caps and the parts covered thereby. An oil leved cock 27 is placed in a hole in the box 1.

A bolt 28 is carried by the cover plate 4 and is adapted to engage a slot 29 in a bracket 30 which is substituted for the tool box of the tractor, so that the inner end of the take-off is adjustably supported by this bracket through means of the nut 31 on the bolt 28 clamping said bolt in adjusted position to the bracket. A supporting member 32, adjustable as to its length by the flaring buckle 33, has a clamp at each end thereof, the upper clamp engaging the outer end of the housing 10 and the lower clamp engaging the pulley housing 34. The housing 8 is attached by a U-bolt 35 to a bracket 36 and this bracket is attached to the rear axle housing 37. The pulley is removed from its shaft 38 and a sprocket 39 attached to said shaft and a chain 40 is passed over the sprockets 13 and 39. This chain can be tightened or loosened by adjusting the length of the support 32 by means of the turnbuckle 33. A universal joint 41 connects the rear end of the shaft 15 with the driven shaft 42 of the machinery which is attached to the tractor by the hitch 43.

As will be seen, the U-bolt 35 passes through slots in the bracket 36 so that the housing 8 can be adjusted so that it will be in alignment with the shaft 42, thus eliminating unnecessary wear and loss of power at the universal joint. The sprockets 13 and 39 can be aligned by adjusting the bolt 28 in the slot in the bracket 30. The take-off can be thrown in and out of gear by the pulley shift lever 44.

From the foregoing it will be seen that the shaft 12 is driven from the pulley shaft of the tractor through means of the chain and sprockets and this shaft, through the gears 15, will rotate the shaft 14 which is connected with the shaft of the machinery to which the tractor is attached by the universal joint 41. Thus the machinery attached to the tractor is driven from the pulley shaft of the tractor. The pulleys 13 and 39 are interchangeable and of different sizes so that by interchanging the pulleys, the take-off can be driven at two different speeds. The sprockets and chain are covered by a suitable housing, not shown.

This take-off can be attached to any standard make of shift pulley without the aid of any special tools and a great number of the principal parts of the take-off are interchangeable with the Ford parts and parts of the machinery. The bearings can be bought from tractor dealers. The device does not interfere with any part of the tractor or its fenders and as the device extends above the rear axle, adjacent the center of the tractor, short turns in any direction can be made without danger of damage to the parts. The rear part of the take-off can be raised or lowered to align it with the shaft of the machinery being driven, thereby eliminating cramping of the universal joints.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A take-off for the pulley shaft of a tractor, comprising a housing extending transversely of the tractor, a shaft in said housing, chain and sprocket means for connecting the outer end of the shaft with the pulley shaft of the tractor, a bracket adjustably connected with the inner end of the housing and attached to a part of the tractor, adjustable supporting means for connecting the outer end of the housing with the pulley shaft housing, a housing extending rearwardly from the first housing, a shaft passing through the second housing, gears connecting the two shafts together, means for adjustably supporting the second housing from a part of the rear axle housing of the tractor and means for connecting the rear end of said second shaft with the machinery attached to the tractor.

2. A take-off for a tractor, comprising a transversely arranged housing and a rearwardly extending housing having its front end connected with the first housing, shafts in the housings, gears connecting the shafts together, ball and thrust bearings arranged in the housings for the shafts, means for attaching the housings to a tractor, a sprocket detachably connected with the shaft in the first housing, a different sized sprocket detachably connected with the pulley shaft of the housing, said sprockets being interchangeable, a chain passing over the sprockets whereby the shafts of the take-off will be driven from the pulley shaft of the tractor and means for attaching the rear end of the shaft in the second housing to machinery.

3. In combination with a tractor, a bracket substituted for the tool box thereof a take-off comprising a transversely arranged housing and a rearwardly extending housing connected with the first housing, means for adjustably connecting the inner end of the transverse housing with the bracket, a support adjustable as to its length connecting the outer end of the transverse housing with the pulley housing of the tractor, the rear housing passing over the rear axle housing of the tractor adjacent the center thereof, a bracket attached to the rear axle housing, means for adjustably connecting the second housing with said bracket, a shaft in each housing of the take-off, gears connecting the shafts together, a sprocket on the outer end of the shaft in the transverse housing, a sprocket on the pulley shaft, said sprockets being of different sizes and interchangeable, a chain passing over the sprockets, said chain being tightened or loosened by adjusting the length of the supporting member, ball and thrust bearings in the housings for the shafts, a shaft connected with the machinery to be driven and a universal joint connecting said shaft with the rear end of the shaft in the rearwardly extending housing of the take-off.

In testimony whereof I affix my signature.
FORREST E. WEBB.